(12) United States Patent
Hirose

(10) Patent No.: US 8,654,870 B2
(45) Date of Patent: Feb. 18, 2014

(54) COMMUNICATION METHOD, COMMUNICATION SYSTEM AND COMMUNICATION DEVICE

(75) Inventor: Yoshinori Hirose, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 217 days.

(21) Appl. No.: 13/359,648

(22) Filed: Jan. 27, 2012

(65) Prior Publication Data

US 2012/0207230 A1 Aug. 16, 2012

(30) Foreign Application Priority Data

Feb. 16, 2011 (JP) ................................. 2011-030413

(51) Int. Cl.
*H04L 27/00* (2006.01)
(52) U.S. Cl.
USPC .......................................... 375/259; 375/220
(58) Field of Classification Search
USPC ........................ 375/219–222, 256–259, 356
See application file for complete search history.

(56) References Cited

U.S. PATENT DOCUMENTS

| | | | | |
|---|---|---|---|---|
| 5,157,599 A | * | 10/1992 | Miyamoto | ..................... 358/471 |
| 5,548,711 A | * | 8/1996 | Brant et al. | .................. 714/5.11 |
| 6,373,405 B1 | | 4/2002 | Nakatsugawa | |
| 2002/0114409 A1 | * | 8/2002 | Shingaki | ........................ 375/340 |
| 2002/0152041 A1 | * | 10/2002 | Loughry | ......................... 702/57 |

FOREIGN PATENT DOCUMENTS

| | | |
|---|---|---|
| JP | 07-095248 | 4/1995 |
| JP | 2000-124960 | 4/2000 |

* cited by examiner

*Primary Examiner* — Emmanuel Bayard
(74) *Attorney, Agent, or Firm* — IPUSA, PLLC

(57) ABSTRACT

A communication system for performing serial communication using a first level, a second level and a middle level includes a first device; a second device; and a signal line, wherein the serial communication is performed by a first communication format signal sent together with a clock from the first device to the second device under a first mode, and a second communication format signal sent from the second device to the first device under a second mode, wherein the first communication format signal includes a first start bit, a plurality of first data bits, a plurality of first inverted data bits, a first check bit generated from the first data bits and a first inversion check bit, and the second communication format signal includes a second start bit, a plurality of second data bits, and a second check bit generated from the second data bits.

12 Claims, 18 Drawing Sheets

COMMUNICATION METHOD, COMMUNICATION SYSTEM AND COMMUNICATION DEVICE

CROSS-REFERENCE TO RELATED APPLICATIONS

This patent application is based upon and claims the benefit of priority of Japanese Patent Application No. 2011-030413 filed on Feb. 16, 2011, the entire contents of which are incorporated herein by reference.

BACKGROUND OF THE INVENTION

1. Field of the Invention

The present invention generally relates to a communication method, a communication system and a communication device. More specifically, the present invention relates to a communication method for performing a bidirectional serial communication, a communication system and a communication device.

2. Description of the Related Art

There is an example of a communication system for performing bidirectional serial communications. Patent Document 1 discloses that data and clocks are subjected to time-division so as to be multiplexed and transmitted by one bus line, another bus line for determining receipt and sending is used, and data are mutually sent and received by these two bus lines.

Patent Document 1 discloses that, at the sending time, a latch circuit outputs a power supply voltage Vcc of an IN terminal at data H received from a data input unit to a contact point a of a switch in synchronization with a clock signal from a clock circuit, the contact point a is divided with resistors R1 and R2 by data L to obtain divided voltage values, the switch is changed over by the clock signal to a or b, the data are output at a, and the clock signal is output at b. It further discloses that, at the receiving time, a signal input into a separation circuit from a sending and receiving changeover switch is separated by a level determination to data and a clock signal, the data are latched and wave-shaped by a latch and shaping circuit and then output. It further discloses that, at the sending time, a decoder operates a level of the send and receive determining line and a receive request input H, outputs H, changes over the sending and receiving changeover switch to a sending side to set the send and receive determining line to be L, and the data and the clock signal are subjected to time-division and transmitted by a bus line.

Patent Document 2 discloses that an information block is divided into plural sub blocks including plural segments, plural inverted sub blocks obtained by inverting all information allocated to each of the plural segments included in the original sub blocks are generated in association with the the original sub blocks, and the plural original blocks and the generated inverted sub blocks are integrated in order to convert information blocks to code blocks.

The example of the communication system has a problem that a data and clock transmission line and a send and receive determining line are necessary for the Serial communication and the serial communication cannot be achieved using only one signal line.

[Patent Document 1] Japanese Laid-open Patent Publication No. H07-95248
[Patent Document 2] Japanese Laid-open Patent Publication No. 2000-124960

SUMMARY OF THE INVENTION

Accordingly, embodiments of the present invention may provide a novel and useful communication method, a communication system and a communication device, in which bidirectional serial communication is performed using only one signal line between a first device and a second device to detect an error of information sent from a first device by the second device, solving one or more of the problems discussed above.

According to an aspect of an embodiment, there is provided a communication system for performing serial communication using a first level, a second level different from the first level and a middle level between the first level and the second level, including a first device; a second device; and a signal line connecting the first device to the second device, wherein the serial communication is performed by a first communication format signal sent together with a clock from the first device to the second device under a first mode, and a second communication format signal sent from the second device to the first device under a second mode, wherein the first communication format signal includes a first start bit, a plurality of first data bits, a plurality of first inverted data bits, a first check bit generated from the first data bits and a first inversion check bit, and the second communication format signal includes a second start bit, a plurality of second data bits, and a second check bit generated from the second data bits.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 1 through FIG. 18 of embodiments of the present invention.

A description is given below, with reference to the FIG. 1 through FIG. 18 of embodiments of the present invention. Reference symbols typically designate as follows:
10: secondary battery;
11: battery monitoring IC;
12: protection IC;
21, 31: input and output circuit;
24, 33, 42, 43, 44, 45: inverter;
41: logic circuit;
46, 47: NOR circuit;
M11, M12, M13: MOS transistor; and
R11, R12: resistor.

<Structure of Communication System>

Figure 1:
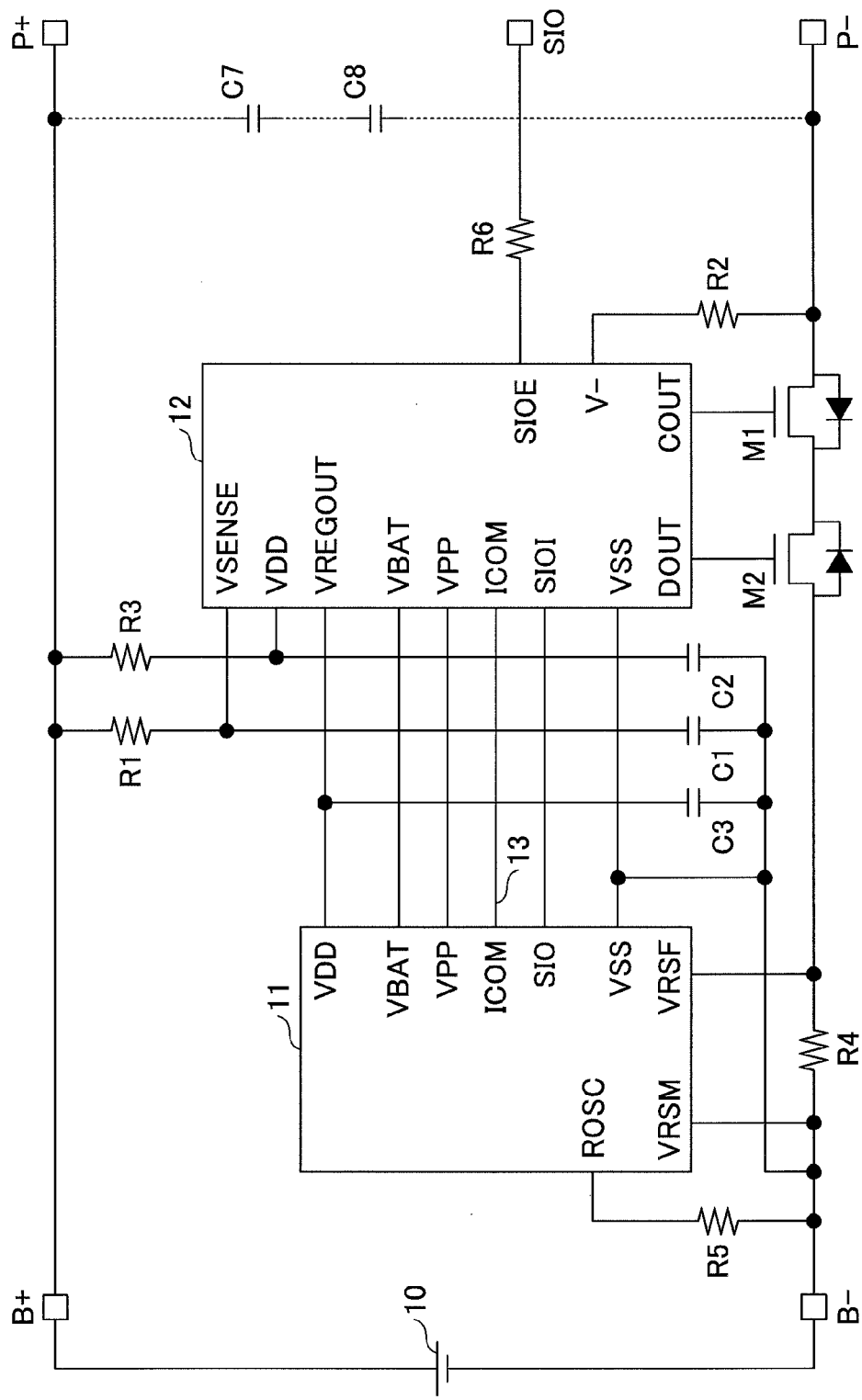
FIG. 1 illustrates an exemplary block chart of a communication system of an embodiment.

FIG. 1 schematically illustrates a communication system of an embodiment. Referring to FIG. 1, a secondary battery such as a lithium ion battery is located between terminals B+ and B−, the terminal B+ is connected to a terminal P+, the terminal B− is connected to a terminal P− via a resistor R4 and MOS transistors M2 and M1, and a load or a charging circuit is connected between the terminals P+, P−.

Voltages at respective ends of the resistor R4 are supplied to terminals VRSM and VRSF of a battery monitoring IC (an integrated circuit) 11 being a first device. A charging and a discharging current of the secondary battery is detected from the difference in potential between VRSM and VRSF. The battery voltage of the secondary battery 10 is supplied to a terminal VBAT via an IC protection IC 12. The IC battery monitoring IC 11 detects the voltage of the terminal VBAT as the voltage of the secondary battery 10. A terminal VDD of the IC battery monitoring IC 11 is supplied with power stabilized by the protection IC 12. The battery monitoring IC 11 has a built-in microcomputer to calculate a battery energy remaining quantity by adding the charging and discharging currents of the secondary battery 10 and perform an overvoltage detection of the secondary battery 10 and an overcurrent detection in charging and discharging, thereby controlling the protection IC 12 based on results of the overvoltage detection and the overcurrent detection.

The protection IC 12 as a second device stabilizes the voltage supplied from the secondary battery 10 via a resistor R3 and supplies the stabilized voltage to the battery monitoring IC 11 via a terminal VREGOUT. The battery voltage of the secondary battery 10 is supplied via the resistor R1 to a terminal VSENSE. The battery voltage is divided by the protection IC 12 and the divided voltage is supplied to the battery monitoring IC 11 via the terminal VBAT. The protection IC 12 compares the voltage of the terminal VSENSE with an overcharge threshold and an overdischarge threshold. If the voltage of the terminal VSENSE exceeds the overcharge threshold, it is determined to be in an abnormal state and the MOS transistor M1 is turned off. If the voltage of the terminal VSENSE is smaller than the overdischarge threshold, it is determined to be in an abnormal state and the MOS transistor M2 is turned off. At the same time, the protection IC 12 stores a control command from the battery monitoring IC 11 in a control register built into the protection IC 12. The protection IC 12 controls charging and discharging of the secondary battery 10 by switching on and off the MOS transistors M1 and M2 in conformity with a content of the control register.

A terminal ICOM of the battery monitoring IC 11 and a terminal ICOM of the protection IC 12 are connected by a signal line 13 to enable bidirectional three-valued serial communication between the battery monitoring IC 11 and the protection IC 12.

<Structure of Input and Output Circuit of Communication System>

Figure 2:
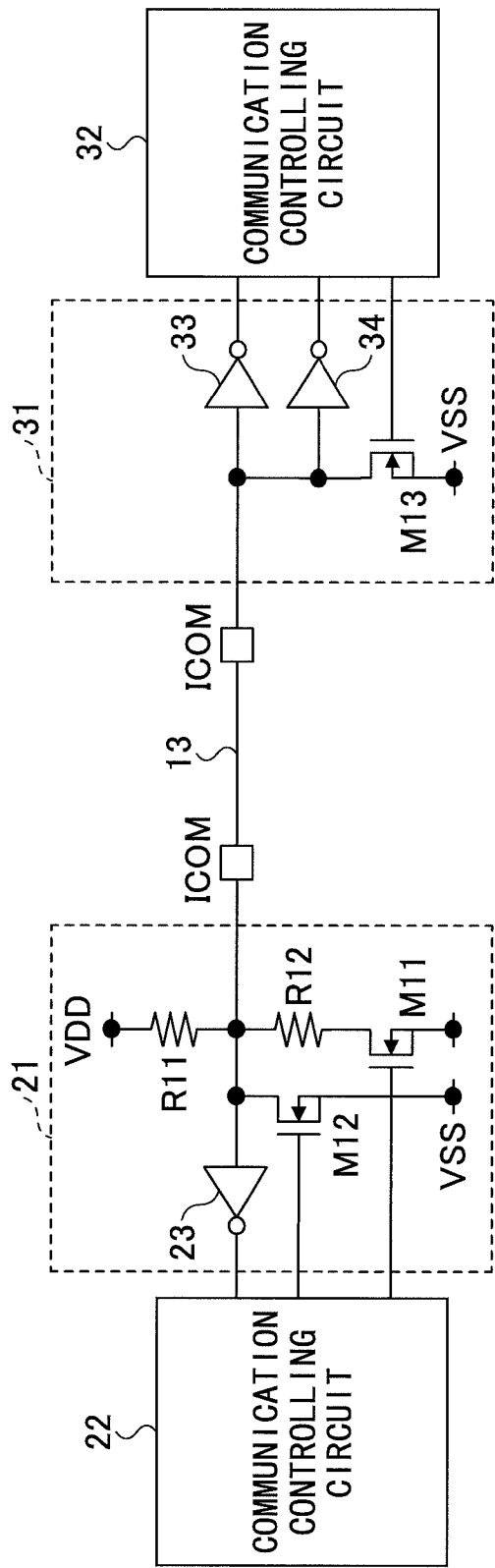
FIG. 2 illustrates an exemplary circuit structure of signal input and output units of a battery monitoring IC and a protection IC.

FIG. 2 is an exemplary circuit diagram of a signal input and output unit of the battery monitoring IC 11 and the protection IC 12. Referring to FIG. 2, an input and output circuit 21 of the battery monitoring IC 11 is connected to the terminal ICOM of the battery monitoring IC 11. Inside the input and output circuit 21, the terminal ICOM of the battery monitoring IC 11 is connected to a power supply VDD via a resistor R11 and also connected to the drain of an n-channel MOS transistor M11 via a resistor R12. The source of the n-channel MOS transistor M11 is connected to an electronic power supply VSS. A middle level output signal is supplied from the communication controlling circuit 22 to a gate of the MOS transistor M11.

The terminal ICOM of the battery monitoring IC 11 is connected to the drain of an n-channel MOS transistor M12. The source of the MOS transistor M12 is connected to the electronic power supply VSS. A low level output signal is supplied from the communication controlling circuit 22 inside the battery monitoring IC 11 to the gate of the MOS transistor M12. Further, the terminal ICOM of the battery monitoring IC 11 is connected to the communication controlling circuit 22 via an inverter 23. The inverter 23 has a first threshold value being a midpoint potential between a middle level and a low level. When the terminal ICOM is in the low level, the inverter 23 supplies the high level to the communication controlling circuit 22. When the terminal ICOM is in the middle level or the high level, the inverter 23 supplies the low level to the communication controlling circuit 22.

An input and output circuit 31 is connected to the terminal ICOM of the protection IC 12. The terminal ICOM of the protection IC 31 is connected to the drain of the n-channel MOS transistor M13 in the input and output circuit 31. The source of the MOS transistor M13 is connected to the electronic power supply VSS inside the protection IC 31. A low level output signal is supplied from a communication controlling circuit 32 inside the battery monitoring IC 12 to the gate of the MOS transistor M13.

Further, the terminal ICOM of the battery monitoring IC 12 is connected to the communication controlling circuit 32 via inverters 33 and 34. The inverter 33 has a first threshold value being a midpoint potential between the middle level and the low level. When the terminal ICOM is in the low level, the inverter 33 supplies the high level to the communication controlling circuit 32. When the terminal ICOM is in the middle level or greater, the inverter 33 supplies the low level to the communication controlling circuit 32. The inverter 34 has a second threshold value being a midpoint potential between the high level and the middle level. When the terminal ICOM is in the middle level or smaller, the inverter 34 supplies the high level to the communication controlling circuit 32. When the terminal ICOM is in the high level, the inverter 33 supplies the low level to the communication controlling circuit 32.

The battery monitoring IC 11 supplies a signal having a value of 0 to the MOS transistors M11 and M12 in order to output a signal of the high level from the terminal ICOM, and supplies a signal having a value of 0 to the MOS transistor M11 and a signal having a value of 1 to the MOS transistor M12 in order to output a signal of the low level from the terminal ICOM. The battery monitoring IC 11 supplies a signal having a value of 1 to the MOS transistor M11 and a signal having a value of 0 to the MOS transistor M12 in order to output a signal of the middle level from the terminal ICOM.

If the low level signal is output from the terminal ICOM while the ICOM is in the middle level, the protection IC 12 supplies the signal having the value 1 to the MOS transistor M13.

<Control Command Sending Mode>

Figure 3:
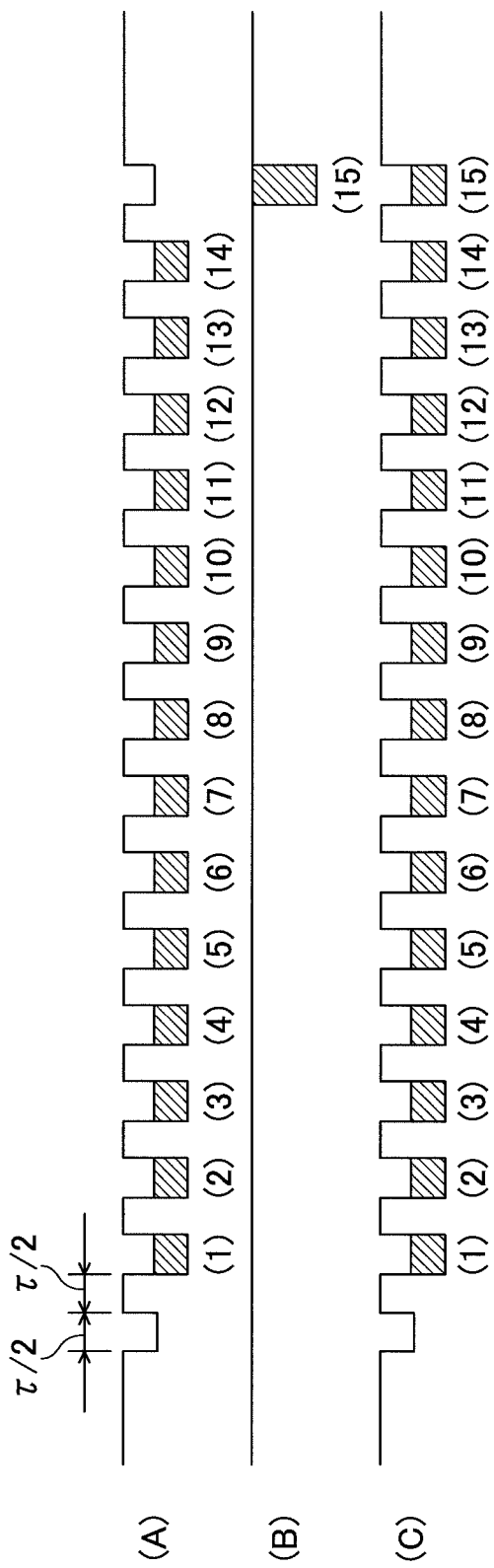
FIG. 3 illustrates exemplary signal timing charts in a control command sending mode.

FIG. 3 illustrates exemplary timing charts of signals in a control command sending mode in which a control command is sent from the battery monitoring IC 11 to the protection IC 12.

The battery monitoring IC 11 sets the terminal ICOM to be in the middle level at a start bit for a predetermined period $\tau/2$ (e.g., several tens of µs), and then sets the terminal ICOM to be in the high level for a predetermined period $\tau/2$ as illustrated in (A) of FIG. 3. The battery monitoring IC 11 set to be in the middle level reports the control command sending mode to the protection IC 12, and reports a one clock cycle in the period $\tau$ of the middle level and the high level. Hatched portions in FIG. 3 indicate one of the middle level and the low level.

Thereafter, by repeating a predetermined period of the middle level or the low level and a predetermined period of the high level several times, for example 14 times, a control command having 14 bits of the middle or low level illustrated as (1) to (14) of (A) of FIG. 3 is sent. The value of the middle level of the bits is 1, and the value of the low level of the bits is 0. The odd bits (1), (3), (5), (7), (9) and (11) among the 14 bits have values of the bits (data bits) themselves, and the even bits (2), (4), (6), (8), (10) and (12) have values inverse to the values of the odd bits (1), (3), (5), (7), (9) and (11). The odd bit (13) is a check bit for an odd parity of the odd bits (1), (3), (5), (7), (9) and (11), and an even bit (14) is an inversion check bit obtained by inverting the check bit. Said differently, the control command is practically formed by seven bits including the check bit. The control command includes an on/off control of the MOS transistor M1 and an on/off control of the MOS transistor M2.

Thereafter, at the time where the battery monitoring IC 11 makes the terminal ICOM be in the middle level, the protection IC 12 makes the terminal ICOM be the high or low level for a predetermined period $\tau/2$ and reports a parity bit (15) to the battery monitoring IC 11 as illustrated in (B) of FIG. 3. The parity bit (15) has the value of an odd parity generated from the received odd bits (1), (3), (5), (7), (9) and (11). For example, if the control command is normally received, the parity bit (15) is set to be in the low level, and if not, the parity bit (15) is set to be in the high level. With this, the signal state (the signal format) in the signal line 13 (i.e., the terminals ICOM of the battery monitoring IC 11 and the protection IC 12) become as illustrated in (C) of FIG. 3.

<State Inquiry Command Receiving Mode>

Figure 4:
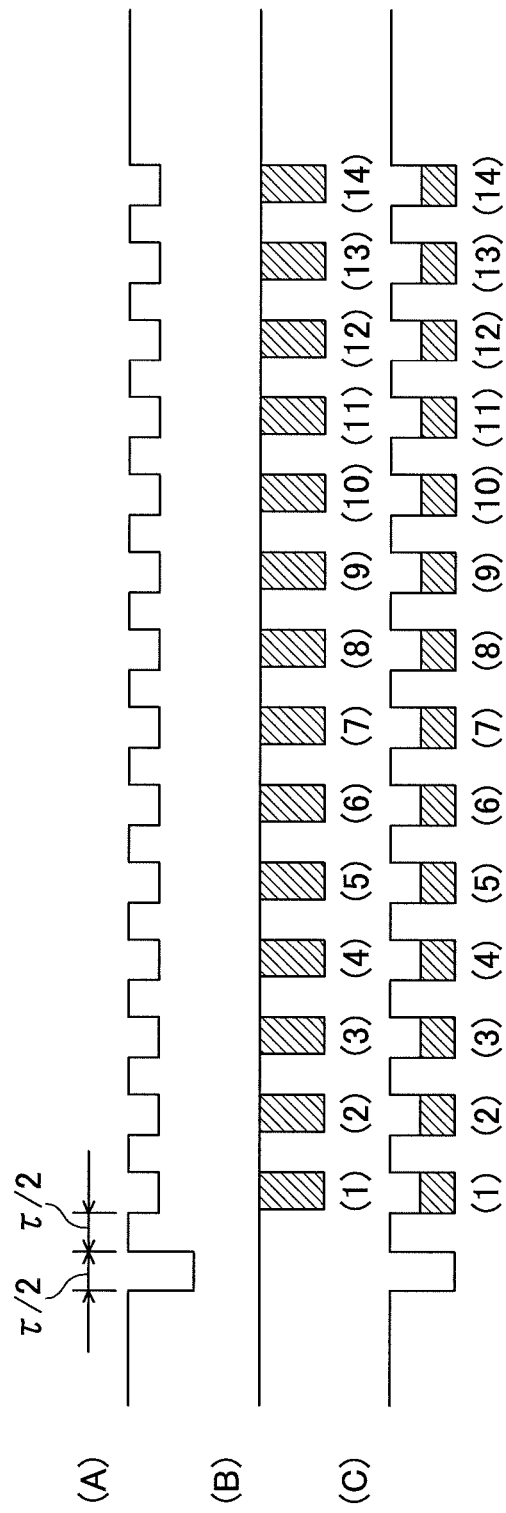
FIG. 4 illustrates exemplary signal timing charts in a command receiving mode.

FIG. 4 illustrates exemplary timing charts of a command receiving mode in which a state is inquired about from the battery monitoring IC 11 to the protection IC 12, and the state response sent from the protection IC 12 is received by the battery monitoring IC 11.

The battery monitoring IC 11 sets the terminal ICOM to be in the low level for a predetermined period $\tau/2$, and then sets the terminal ICOM to be in the high level for a predetermined period $\tau/2$ as illustrated in (A) of FIG. 4. In the battery monitoring IC 11, the start bit of the low level is sent to report the state inquiry command receiving mode to the protection IC 12, and then one clock cycle is reported during the period $\tau$ in the middle or high level. Thereafter, the predetermined period of the middle level and the predetermined period of the high level for several times, for example 14 times, are used to send clocks.

Thereafter, at the timing when the terminal ICOM of the battery monitoring IC 11 is in the middle level, the protection IC 12 sends a status of 14 bits in the high or low level illustrated in (1) to (14) of (B) of FIG. 4. The value of the high level of the bits is 1, and the value of the low level of the bits is 0. The bits (1) to (13) among the 14 bits have values of the bits (data bits) themselves of the status, and the bit (14) is a check bit as an odd parity of the bits (1) to (13). Said differently, the control command is practically formed by 14 bits including the check bit. With this, the signal state (the signal format) in the signal line 13 (i.e., the terminals ICOM of the battery monitoring IC 11 and the protection IC 12) become as illustrated in (C) of FIG. 4. There are an on/off state of the MOS transistor M1 and an on/off state of the MOS transistor M2.

<Interrupt Receiving Mode>

Figure 5:
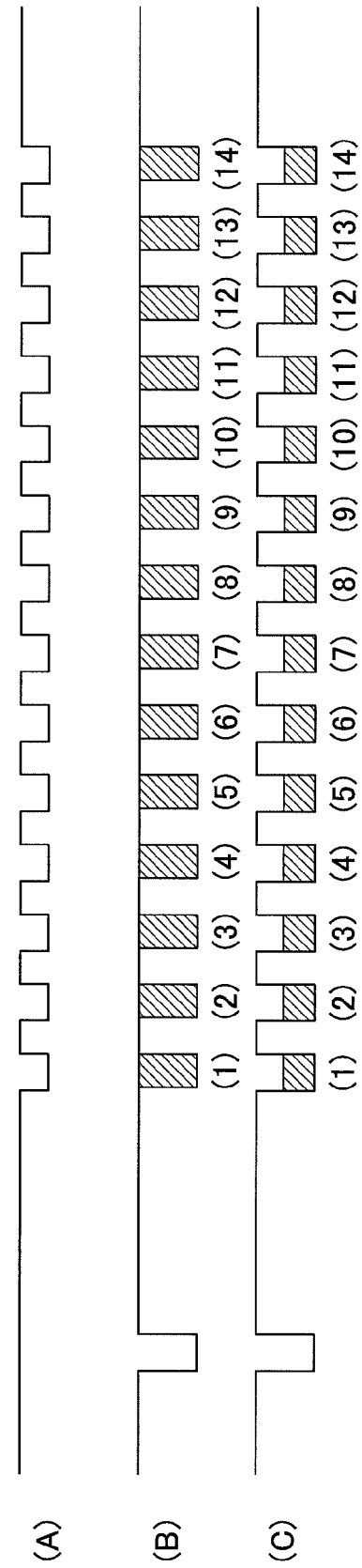
FIG. 5 illustrates exemplary signal timing charts in an interrupt receiving mode.

FIG. 5 illustrates exemplary timing charts in an interrupt receiving mode in which the protection IC 12 interrupts the battery monitoring IC 11 to receive a state report sent for the protection IC 12 by the battery monitoring IC 11.

The protection IC 12 makes the terminal ICOM to be in the low level for the predetermined period $\tau/2$ as illustrated in (B) of FIG. 5. The protection IC 12 reports the interrupt receiving mode to the battery monitoring IC 11 by making the start bit in the low level.

In response, the battery monitoring IC 11 sets the terminal ICOM to be in the low level for a predetermined period $\tau/2$, and then sets the terminal ICOM to be in the high level for a predetermined period $\tau/2$ as illustrated in (A) of FIG. 5.

Thereafter, at the timing when the terminal ICOM of the battery monitoring IC 11 is in the middle level, the protection IC 12 sends a status of 14 bits in the high or low level illustrated in (1) to (14) of (B) of FIG. 5. The value of the high level of the bits is 1, and the value of the low level of the bits is 0. The bits (1) to (13) among the 14 bits have values of the bits (data bits) themselves of the status, and the bit (14) is a check bit as an odd parity of the bits (1) to (13). Said differently, the control command is practically formed by 14 bits including the check bit. With this, the signal state (the signal format) in the signal line 13 (i.e., the terminals ICOM of the battery monitoring IC 11 and the protection IC 12) becomes as illustrated in (C) of FIG. 5.

<State Transition Diagram of Battery Monitoring IC>

Figure 6:
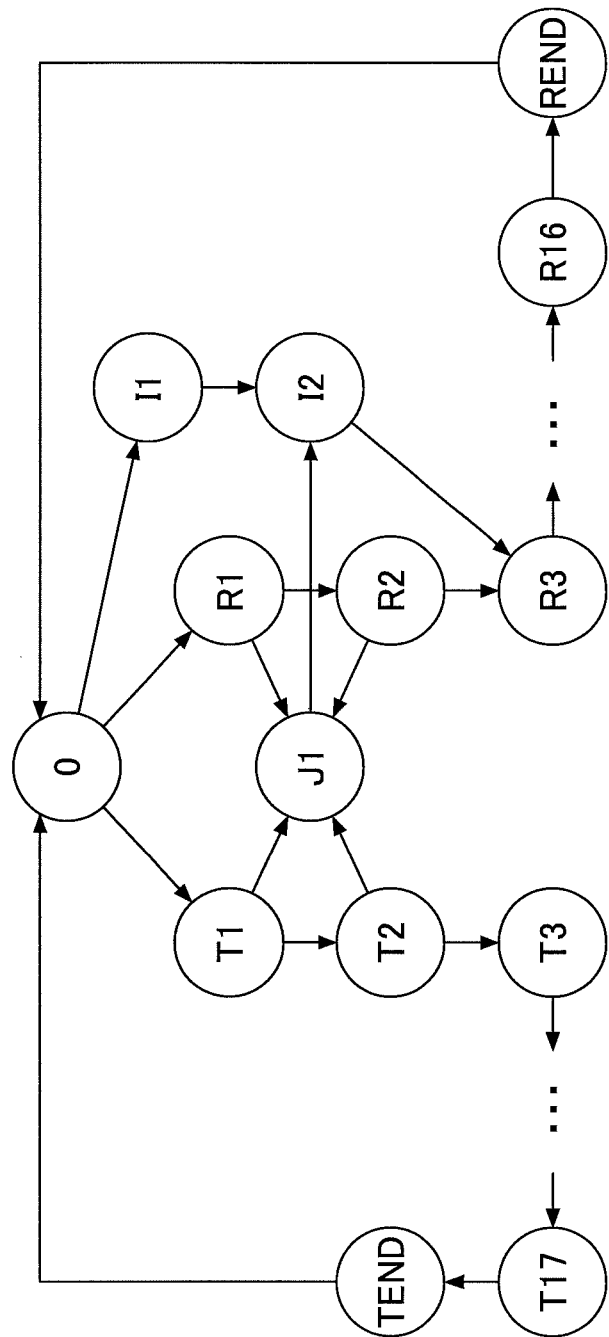
FIG. 6 illustrates an exemplary state transition diagram in a battery monitoring IC.

FIG. 6 is an exemplary state transition diagram in the battery monitoring IC 11. Referring to FIG. 6, an initial state is a sequence 0. When the control command sending mode is started in the battery monitoring IC 11, the sequence 0 changes to a sequence T1. If there is no problem, a sequence T1 to a sequence TEND are sequentially transited by the battery monitoring IC 11 at clock periods, and the battery monitoring IC 11 returns to the sequence 0.

When the state inquiry command receiving mode is started in the battery monitoring IC 11, the sequence 0 changes to a sequence R1. If there is no problem, the sequence R1 to a sequence REND are sequentially transited by the battery monitoring IC 11 at clock periods, and the battery monitoring IC 11 returns to the sequence 0.

When the battery monitoring IC 11 detects the low level in the terminal ICOM, the mode changes to the interrupt receiving mode. Then, the battery monitoring IC 11 moves from the sequence 0 to a sequence I1, and transits the sequence I1, a sequence I2, and the sequence R3 to the sequence REND to return to the sequence 0.

If the low level of the terminal ICOM is detected by the battery monitoring IC in any of the sequence T1, a sequence T2, the sequence R1 and a sequence R2, the battery monitoring IC 11 transits to a sequence J1. The transition to the sequence J1 is generated when the control command sending mode or the state inquiry command receiving mode competes against the interrupt receiving mode.

With the embodiment, in order to avoid the competition, priority of the interrupt receiving mode is set higher than the control command sending mode or the state inquiry command receiving mode. With this, the battery monitoring IC 11 transits from the sequence J1 to the sequence I2, sequentially transits the sequence R3 to the sequence REND, and returns to the sequence 0.

<Signal Input and Output Unit of Protection IC>

Figure 7:
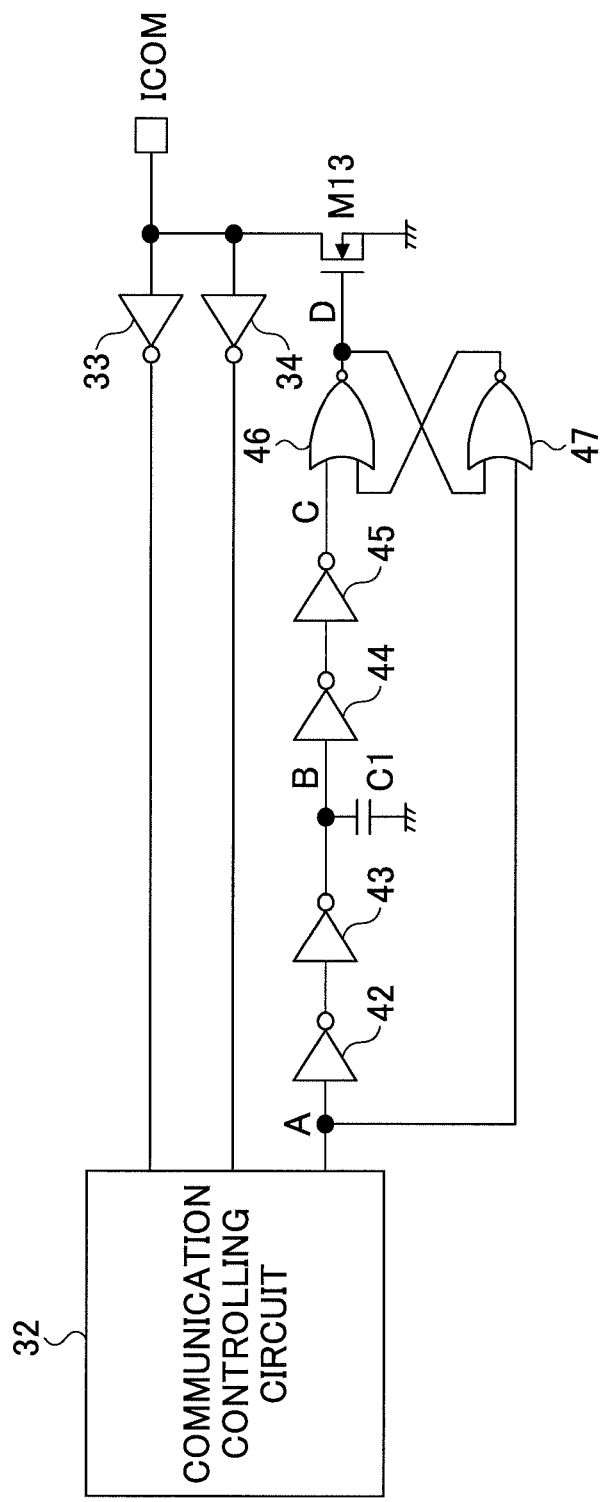
FIG. 7 illustrates an exemplary circuit structure of the signal input and output unit of the protection IC.

FIG. 7 illustrates an exemplary circuit structure of the signal input and output unit of the protection IC 12. Referring to FIG. 7, the same reference symbols as those in FIG. 2 are attached to the same portions. Further, the terminal ICOM of the protection IC 12 is connected to the communication controlling circuit 32 via the inverters 33 and 34.

Figure 8:
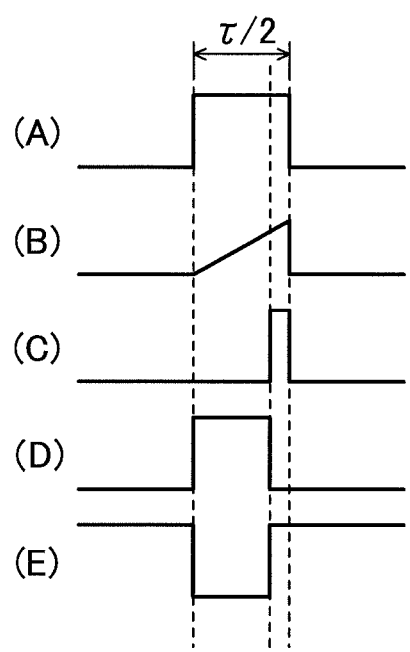
FIG. 8 illustrates exemplary signal waveform diagrams obtained from various portions of FIG. 7.

The communication controlling circuit 32 separates a clock of the input signal supplied from the inverter 33 and outputs a pulse signal having the high level period of $\tau/2$ (see (A) of FIG. 8) at a timing of the low level output among the status of 14 bits in synchronization with the separated clock. The signal output by the communication controlling circuit 32 is supplied to a NOR circuit 46 via inverters 42, 43, 44 and 45 and a NOR circuit 47.

A connection point between the inverters 43 and 44 is grounded via a capacitor C1, and the voltage of the capacitor C1 receiving the pulse signal is shaped like a ramp, as illustrated in (B) of FIG. 8. With this, the pulse width of the output signal of the inverter 45 is reduced as illustrated in (C) of FIG. 8.

The output of the NOR circuit 46 is supplied to the gate of the MOS transistor M13 and also supplied to an input terminal of the NOR circuit 47. The output of the NOR circuit 47 is supplied to an input terminal of the NOR circuit 46. Therefore, the pulse width of the output of the NOR circuit 46 becomes narrower than that of the output pulse signal from the communication controlling circuit 32 as illustrated in (D) of FIG. 8. Then, the MOS transistor M13 is turned on at the high level period of the pulse signal output by the NOR circuit 46 thereby causing the terminal ICOM to be in the low level in synchronization with the clock as illustrated in (E) of FIG. 8. Said differently, in the low level period illustrated in (E) of FIG. 8, the pulse width in the ICOM becomes smaller than the pulse width ($\tau/2$) of the output pulse signal. If the low level period of (E) of FIG. 8 output by the protection IC is $\tau/2$, all information pieces in the middle level of the clock output by the battery monitoring IC 11 disappear. In order to prevent the clock information in the middle level disappearing, the low level period of (E) of FIG. 8 is made narrower than $\tau/2$.

Figure 9:
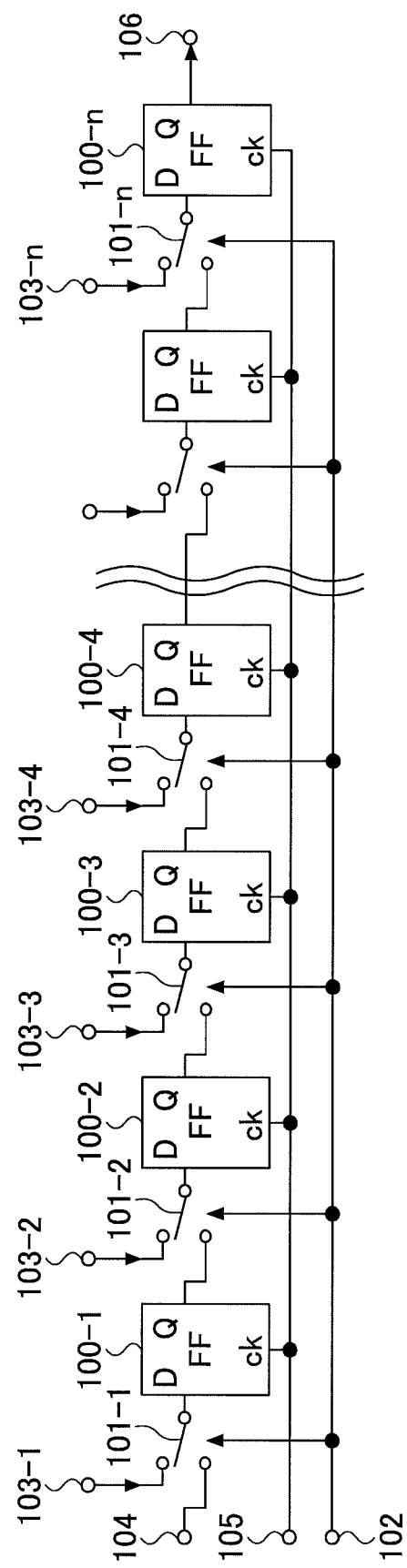
FIG. 9 illustrates an exemplary structure of a shift register.

The communication controlling circuit 32 illustrated in FIG. 7 includes a shift register illustrated in FIG. 9. The shift register includes n-stage D-type flip-flops 100-1 to 100-n and switches 101-1 to 101-n respectively connected to the D input terminals of the n-stage D-type flip-flops 100-1 to 100-n. For example, the switches 101-1 to 101-n are switched to terminals 103-1 to 103-n when a signal having a value of 0 is supplied to a terminal 102, and statuses of n bits supplied from the terminals 103-1 to 103-n are set in the n-stage D-type flip-flops 100-1 to 100-n along with an input of a clock from a terminal 105.

Thereafter, the value of the terminal 102 becomes a value 1. Then, the switch 101-1 connects the D input terminal of the flip-flop 100-1 to the terminal 104, and the switches 101-2 to 101-n connect the D input terminals of the flip-flops 100-2 to 100-n to Q input terminals of the flip-flops 100-1 to 100-n-1 on the previous stages, thereby forming a shift register. A clock separated by the communication controlling circuit 32 from the input signal into the terminal ICOM is input into the terminal 105 and is supplied to clock input terminals of the flip-flops 100-1 to 100-n. With the input of the clock, the status of n bits set in the flip-flops 100-1 to 100-n is sequentially shifted by the flip-flops 100-1 to 100-n and output from the terminal 106 in series.

Figure 10:
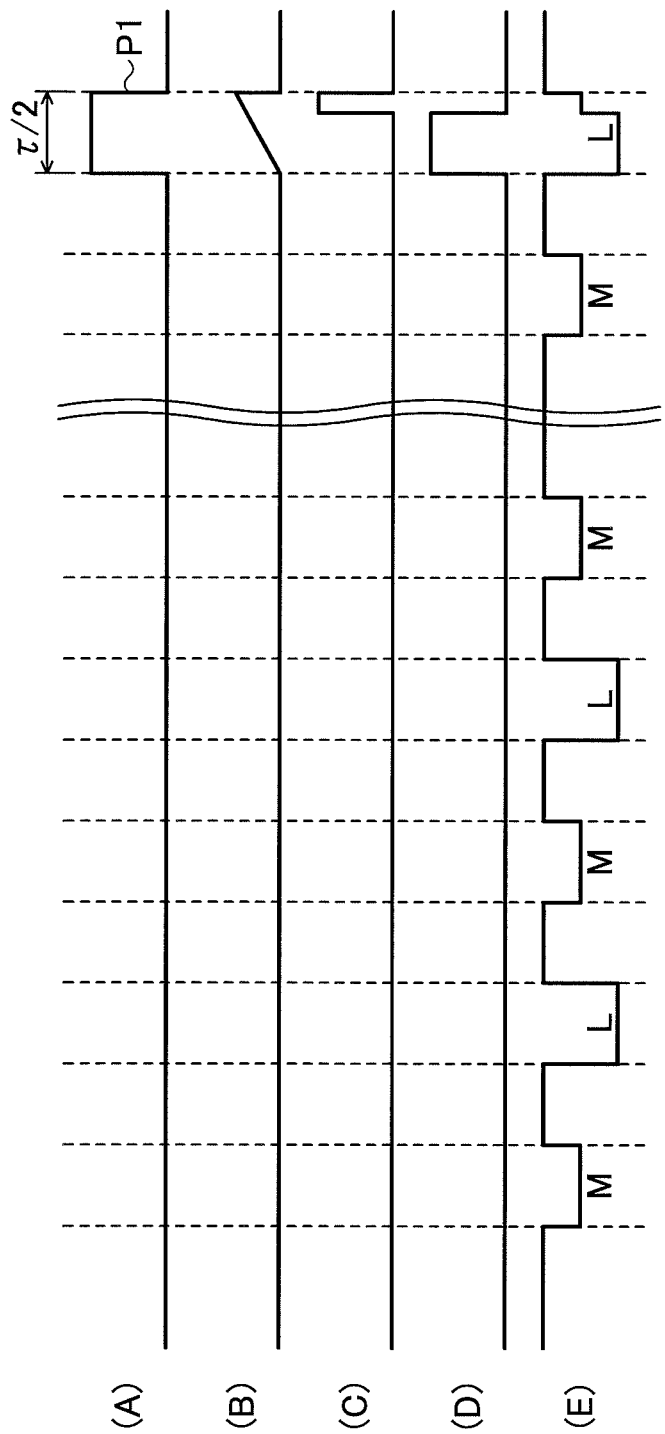
FIG. 10 illustrates exemplary signal waveform diagrams of various portions in FIG. 7 in the control command sending mode.

Referring to FIG. 10, exemplary waveforms of (A) to (E) correspond to the input into the inverter 42, the voltage of the capacitor C1, the output from the inverter 45, the output from the NOR circuit 47 and the terminal ICOM in the command sending mode, respectively illustrated in FIG. 7. If the protection IC 12 supplies a pulse of the high level P1 illustrated in (A) of FIG. 10 to the inverter 42 in order to cause the terminal ICOM to output the low level, the terminal ICOM is in the low level during a first half of the period $\tau/2$ of the pulse P1 and in the middle level in the second half as illustrated in (E) of FIG. 10.

Figure 11:
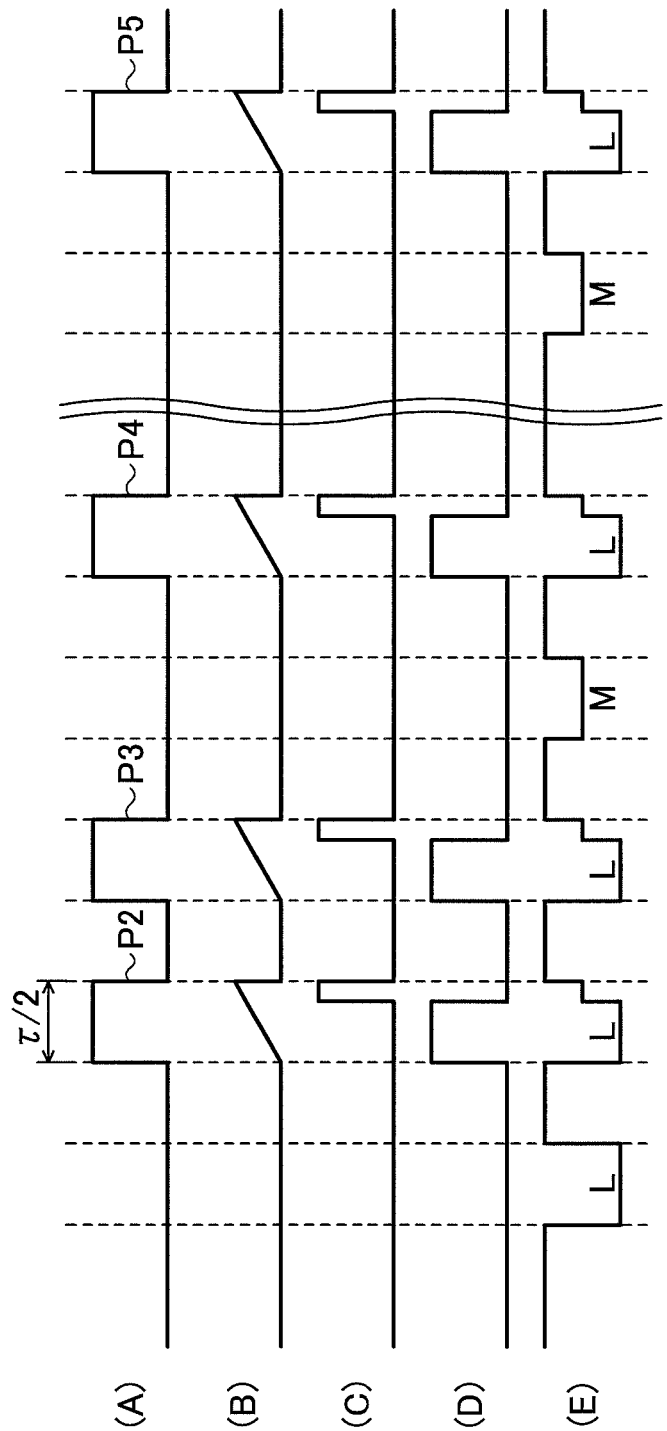
FIG. 11 illustrates exemplary signal waveform diagrams of various portions in FIG. 7 in the state inquiry command sending mode.

Referring to FIG. 11, exemplary waveforms of (A) to (E) correspond to the input into the inverter 42, the voltage of the capacitor C1, the output from the inverter 45, the output from the NOR circuit 47 and the terminal ICOM in the state inquiry command receiving mode, respectively illustrated in FIG. 7. If the protection IC 12 supplies pulses of the high level P2 to P5 illustrated in (A) of FIG. 11 to the inverter 42 in order to cause the terminal ICOM to output the low level, the terminal ICOM is in the low level during first halves of the periods $\tau/2$ of the pulses P2 to P5 and in the middle level in the second halves as illustrated in (E) of FIG. 11.

Figure 12:
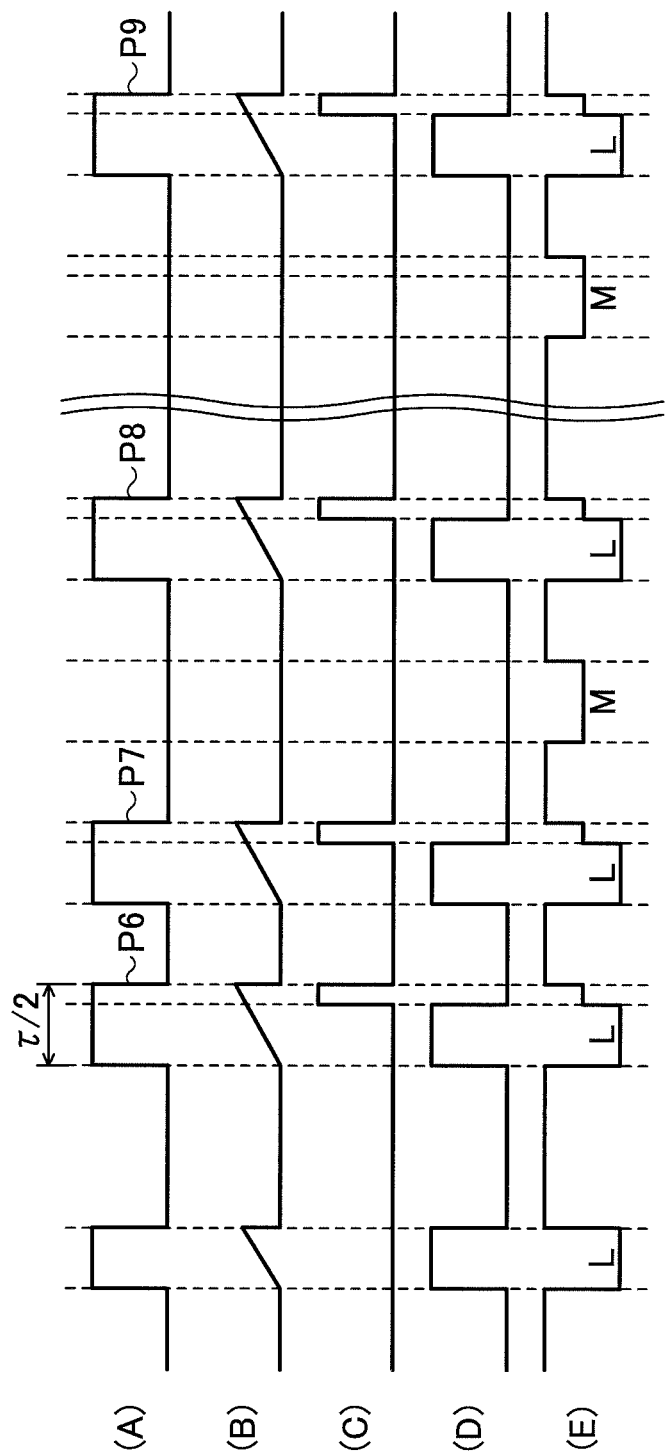
FIG. 12 illustrates exemplary signal waveform diagrams of various portions in FIG. 7 in the interrupt receiving mode.

Referring to FIG. 12, exemplary waveforms of (A) to (E) correspond to the input into the inverter 42, the voltage of the capacitor C1, the output from the inverter 45, the output from the NOR circuit 47 and the terminal ICOM in the interrupt receiving mode, respectively illustrated in FIG. 7. If the protection IC 12 supplies pulses of the high level P6 to P9 illustrated in (A) of FIG. 12 to the inverter 42 in order to cause the terminal to output the low level, the terminal ICOM is in the low level during first halves of the periods $\tau/2$ of the pulses P6 to P9 and in the middle level in the second halves as illustrated in (E) of FIG. 12.

<Signal Output Process of Protection IC>

Figure 13:
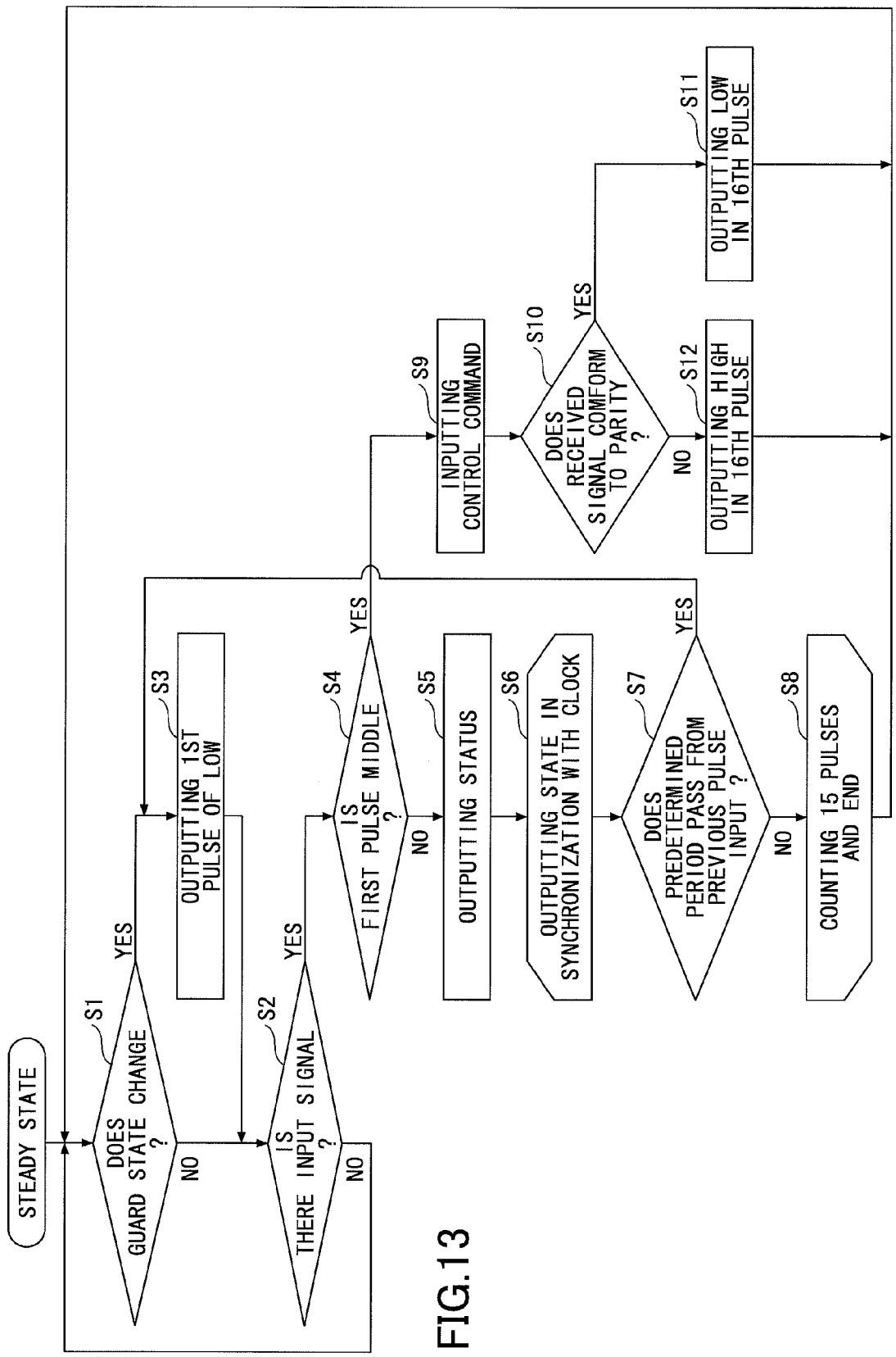
FIG. 13 illustrates an exemplary flowchart of a signal output process performed by the protection IC.

FIG. 13 is an exemplary flowchart of a signal output process performed by the protection IC 12. Referring to FIG. 13, under a steady state, it is determined whether a guard state is changed in step S1; said differently, whether the guard state is changed from the steady state to an abnormal state or the like. If there is no change in the guard state, it is determined whether there is an input signal from the terminal ICOM. If there is no input signal, the process goes to step S1.

If it is determined that the guard state is changed in step S1, the first pulse of the low level is output from the terminal ICOM in step S3 so that the interrupt receiving mode is reported from the protection IC 12 to the battery monitoring IC 11. Then, the process goes to step S2. If there is the input signal in step S2, it is determined in step S4 whether the first pulse in the terminal ICOM is the middle level.

If the first pulse is not in the middle level in step S4, the mode is the status inquiry command receiving mode or the interrupt receiving mode. Therefore, an output of the status is recognized in step S5, and bits of the status are sent in synchronization with the clock in step S6. Next, it is determined whether there is a next pulse after a lapse of a predetermined period (e.g., several times to several tens of times of τ) from the immediately preceding pulse input in step S7.

If there is no next pulse input after the predetermined period, the low level output in step S3 is considered to be not recognized by the battery monitoring IC 11. Then, the process goes again to step S3 to repeat the process in step S3. If there is a next pulse input within the predetermined period, the pulses of the high level are counted up to 15 pulses and the status transmission is completed to return to the steady state in step S8.

On the other hand, if the first pulse is in the middle level in step S4, the mode is the control command sending mode. Therefore, the bits of the control command sent from the battery monitoring IC 11 are received and input in step S9. Then, it is determined in step S10 whether odd bits (1), (3), (5), (7), (9), (11) and (13) respectively match even bits (2), (4), (6), (8), (10), (12) and (14) and whether an odd parity calculated from the odd bits (1), (3), (5), (7), (9), (11) and (13) matches a check bit of the odd bit (13). If the odd parity matches the check bit, the low level is output from the terminal ICOM to report to the battery monitoring IC 11. Then, the steady state is retrieved. If the odd parity does not match the check bit, the low level is output from the terminal ICOM in step S12 to a report reception failure to the battery monitoring IC 11. Then, the steady state is retrieved. With this, bidirectional serial communication is realized by one signal line.

Although the bidirectional communication is realized by sending the clocks in the high and middle levels from the battery monitoring IC 11 and sending the low level signal from the protection IC 12 in the above, the clocks in the low and middle levels from the battery monitoring IC 11 and may be sent and the high level signal may be sent from the protection IC 12 to perform the bidirectional communication.

<Noise Contamination>

Figure 14:
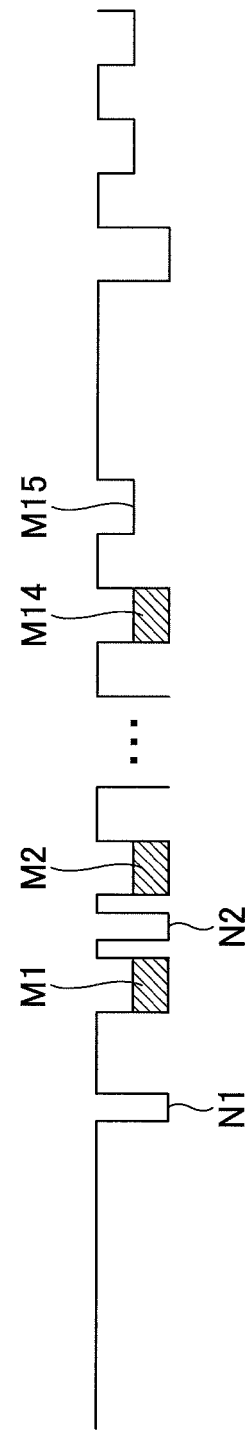
FIG. 14 illustrates an exemplary waveform diagram in a signal line.

FIG. 14 is an exemplary waveform in the signal line 13. Referring to FIG. 14, if a noise N1 of a negative pulse is mixed when there is no communication, the battery monitoring IC 11 erroneously recognizes that the interrupt receiving mode starts, and the protection IC 12 erroneously recognizes that the state inquiry command receiving mode is started. With this, the battery monitoring IC 11 automatically outputs clocks at a predetermined interval until the communication is completed, and the protection IC 12 outputs the status in conformity with the middle level period of the clock.

The following description is given on the premise that noise N2 is mixed between the first middle level M1 and the second middle level M2 output from the battery monitoring IC 11. The battery monitoring IC 11 does not perform the sequence due to the existence of the noise N2. However, the protection IC 12 may perform the sequence by erroneously recognizing the noise N2 as an output of the middle level from the battery monitoring IC 11. This is because the protection IC 12 recognizes a voltage of the signal line 13 being the second threshold value or smaller as the middle level and communicates in synchronization with the middle level.

The battery monitoring IC 11 outputs the clocks until the end of the communication in the interrupt receiving mode, and thereafter recognizes the state is the non-communication state. Because the protection IC 12 detects the middle level output from the signal line 13 to be one greater than the clock pulse number output by the battery monitoring IC 11, the protection IC 12 recognizes the non-communication state after outputting the 14th middle level M14 from the battery monitoring IC 11, and erroneously recognizes the middle level M15 output from the battery monitoring IC 11 as the start signal for the control command sending mode.

The following description is given on the premise that the battery monitoring IC 11 starts the state inquiry command receiving mode after several clocks after outputting the middle level M15. At this time, the protection IC 12 may recognize that not the state inquiry command receiving mode but the control command sending mode is active. With the above-described phenomenon, a control command having an erroneous value may be written in the register of the protection IC 12.

However, with the embodiment, the register of the protection IC 12 is prevented from being erroneously written by performing the error detecting process described below.

The value of the parity bit in the control command sending mode constantly becomes 0 if the protection IC 12 properly receives data. However, if the data are erroneously received by an influence of noise during communication, the value of the parity bit may become 1. Therefore, if the battery monitoring IC 11 receives the parity bit having the value 1 in the control command sending mode, the battery monitoring IC 11 recognizes that the parity bit having the value 1 indicates a communication error.

<First Embodiment of Error Detecting Process>

Figure 15:
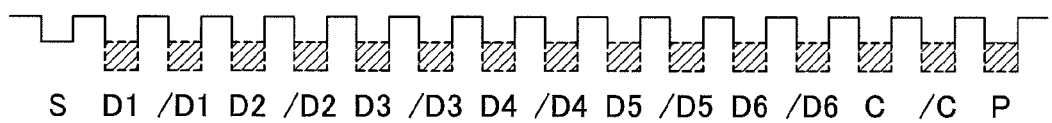
FIG. 15 illustrates an exemplary signal format in a control command sending mode.

FIG. 15 is an exemplary signal format in the control command sending mode of a First Embodiment. FIG. 15 corresponds to (C) of FIG. 3. Referring to FIG. 15, the first middle level output by the battery monitoring IC 11 is a start bit S, an odd bit (1) is a data bit D1, and an even bit (2) is an inverted data bit /D1 ("/" means inversion). In a manner similar to the above, odd bits and even bits (3) to (12) are data bits D2 to D6 and inverted data bits /D2 to /D6, respectively. Further, an odd bit (13) is a check bit C and an even bit (14) is an inversion check bit /C. Furthermore, a parity bit (15) output by the protection IC 12 is a parity bit P.

Figure 16:
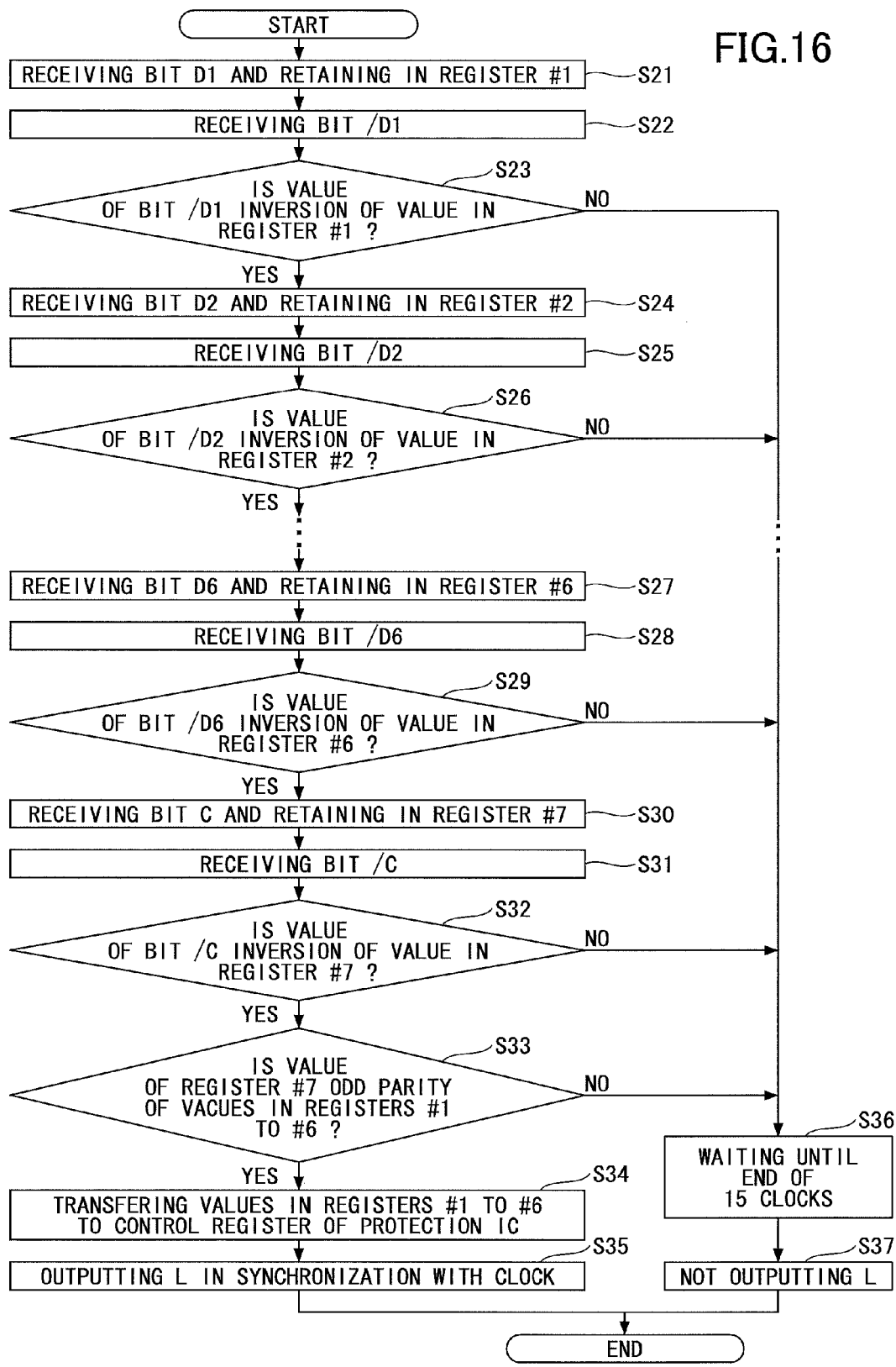
FIG. 16 illustrates an exemplary flowchart of an error detecting process of a First Embodiment.

FIG. 16 is a flowchart of the error detecting process performed by the protection IC 12 of the First Embodiment. Referring to FIG. 16, the bit D1 is received and retained in step S21. The bit /D1 is received in step S22. In step S23, it is determined whether the value of the bit /D1 is the same as a value obtained by inverting the value retained in a register #1. If the value of the bit /D1 is the same as the value obtained by inverting the value retained in the register #1, the process goes to step S24. If not, the process goes to step S36.

In step S24, the bit D2 is received and retained in a register #2. The bit /D2 is received in step S25. In step S26, it is determined whether the value of the bit /D2 is the same as a value obtained by inverting the value retained in a register #2. If the value of the bit /D2 is not the same as the value obtained by inverting the value retained in the register #2, the process goes to step S36.

If the value of the bit /D2 is the same as the value obtained by inverting the value retained in the register #2 in step S26, processes similar to those in steps S21 to S23 are performed. If values of the bits /D3, /D4 and /D5 are the same as values obtained by inverting values retained in a register #3 to a register #5, the process goes to step S27. If not, the process goes to step S36.

In step S27, the bit D6 is received and retained in a register #6. The bit /D6 is received in step S28. In step S29, it is determined whether the value of the bit /D6 is the same as a value obtained by inverting the value retained in a register #6. If the value of the bit /D6 is the same as the value obtained by inverting the value retained in the register #6, the process goes to step S30. If not, the process goes to step S36.

In step S30, the bit C is received and retained in a register #7. The bit /C is received in step S31. In step S32, it is determined whether the value of the bit /C is the same as a value obtained by inverting the value retained in a register #7. If the value of the bit /C is the same as the value obtained by inverting the value retained in the register #7, the process goes to step S33. If not, the process goes to step S36. Next, in step S33, it is determined whether the value retained in the register #7 is the same as the value of an odd parity of the values retained in the registers #1 to #6. If the value retained in the register #7 is the same as the value of the odd parity of the values retained in the registers #1 to #6, the process goes to step S34. If not, the process goes to step S36.

In step S34, the values retained in the registers #1 to #6 are transferred to a control register of the protection IC 12. Next, in step S35, the low level is output from the terminal ICOM in synchronization with the clock supplied from the battery monitoring IC 11, and the process ends.

Meanwhile, in step S36, the process waits until the clock is supplied from the battery monitoring IC 11 by 15 pulses. Next, in step S37, the low level is not output from the terminal ICOM in synchronization with the clock supplied from the battery monitoring IC 11, and the process ends. As described, it is possible to prevent the control register of the protection IC 12 from being erroneously written in.

Meanwhile, when the battery monitoring IC 11 starts the control command sending mode and the protection IC 12 simultaneously starts the interrupt receiving mode, a competition occurs. Then, communication between the battery monitoring IC 11 and the protection IC 12 may be stopped while the protection IC 12 recognizes that the communication is being done because frame lengths in the control command sending mode and the interrupt receiving mode are different. This phenomenon is similar to that in the noise contamination in FIG. 14. At this time, when other communication is started, there is a probability that erroneous data are written in the control bit of the protection IC 12. However, as to the signal format illustrated in FIG. 3 of the embodiment, only in the control command sending mode, pairs of the data bits D1 to D6 (original signals) and the inverted data bits /D1 to /D6 (inversion signals) are output from the battery monitoring IC 11. Therefore, it is possible to prevent the control register from being written in by detecting abnormal communication on the side of the protection IC 12.

<Second Embodiment of Error Detecting Process>

Figure 17:
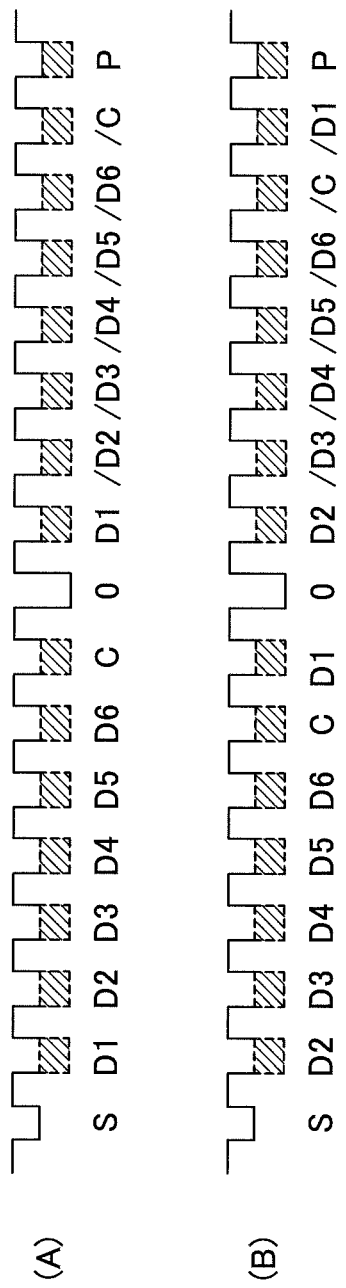
FIG. 17 illustrates exemplary signal formats in a control command sending mode of a Second Embodiment.

FIG. 17 is an exemplary signal format in the control command sending mode of a Second Embodiment. Referring to (A) of FIG. 17, the battery monitoring IC 11 sequentially outputs a star bit S, data bits D1 to D6, and a check bit C being an odd parity of data bits D1 to D6. Thereafter, a constant bit of a value of 0 (the low level) is output. Further, the data D1 is output again. Thereafter, inverted data bit /D2 to inverted data bit /D6 are output and an inversion check bit /C being an inverted odd parity is output. Thereafter, the protection IC 12 outputs the received data bits D1 to D6 and a parity bit P being the odd parity of the check bit C.

Instead of (A) of FIG. 17, a modified structure of (A) may be employed. In this modified structure, the data bits D2 to D6, C and D1 are sequentially output, the constant bit 0 is output, and the data bit D2, the inverted data bits /D3 to /D6, the inversion check bit /C and the inverted data bit /D1 are sequentially output as illustrated in (B) of FIG. 17.

Figure 18:
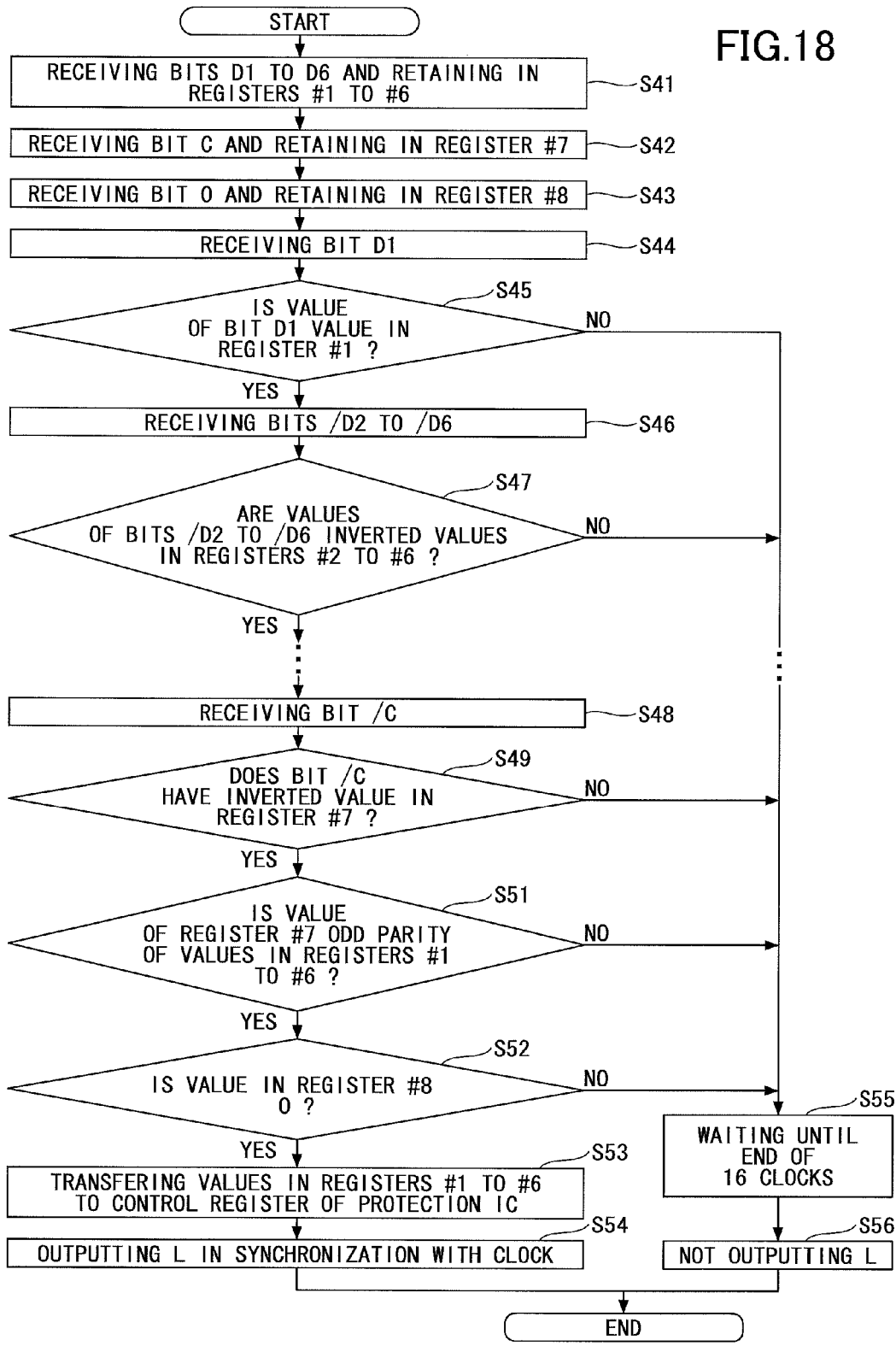
FIG. 18 illustrates an exemplary flowchart of an error detecting process of the Second Embodiment.

FIG. 18 is a flowchart of the error detecting process performed by the protection IC 12 of the Second Embodiment. This process corresponds to the signal format illustrated in (A) of FIG. 17. Referring to FIG. 18, the bits D1 to D6 are received and retained in the registers #1 to #6. In step S42, the bit C is received and retained in the registers #1 to #6. In step S43, the bit 0 is received and retained in the register #8. In step S44, the bit D1 following the bit 0 is received.

In step S45, it is determined whether the value of the bit D1 received in step S44 is the same as a value retained in the register #1. If the value of the bit D1 received in step S44 is the same as the value retained in the register #1, the process goes to step S46. If not, the process goes to step S55.

The bits /D2 to /D6 are received in step S46. In step S47, it is determined whether the values of the bits /D2 to /D6 are the same as values obtained by inverting the values retained in the registers #2 to #6. If the values of the bits /D2 to /D6 are the same as the values obtained by inverting the values retained in the registers #2 to #6, the process goes to step S48. If not, the process goes to step S55.

In step S48, the bit /C is received. In step S49, it is determined whether the value of the bit /C is the same as a value obtained by inverting the value retained in the register #7. If the value of the bit /C is the same as the value obtained by inverting the value retained in the register #7, the process goes to step S51. If not, the process goes to step S55.

Next, in step S51, it is determined whether the value retained in the register #7 is the same as the value of an odd parity of the values retained in the registers #1 to #6. If the value retained in the register #7 is the same as the value of the odd parity of the values retained in the registers #1 to #6, the process goes to step S52. If not, the process goes to step S55. In step S52, it is determined whether the value retained in the register #8 is 0. If the value retained in the register #8 is 0, the process goes to step S53. If not, the process goes to step S55.

In step S53, the values retained in the registers #1 to #6 are transferred to the control register of the protection IC 12. Next, in step S54, the low level is output from the terminal ICOM in synchronization with the clock supplied from the battery monitoring IC 11, and the process ends.

Meanwhile, in step S55, the process waits until the clock is supplied from the battery monitoring IC 11 by 16 pulses. Next, in step S56, the low level is not output from the terminal ICOM in synchronization with the clock supplied from the battery monitoring IC 11, and the process ends. As described, it is possible to prevent the control register of the protection IC 12 from being erroneously written in.

With the signal format illustrated in FIG. 15, if the data bits D1 to D6 are in an alternating pattern of 0 and 1 and a sequential shift occurs between the battery monitoring IC 11 and the protection IC 12, there is a probability that the sequential shift is detected. However, by using the signal formats illustrated in (A) or (B) of FIG. 17, even if the sequential shift occurs between the battery monitoring IC 11 and the protection IC 12, the error (the sequential shift) can be securely detected.

According to the embodiments, bidirectional serial communication can be performed using only one signal line and an error of information sent from a first device to a second device can be detected by the second device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A communication system for performing serial communication using a first level, a second level different from the first level and a middle level between the first level and the second level, the communication system comprising:
   a first device;
   a second device; and
   a signal line connecting the first device to the second device,
   wherein the serial communication is performed by
      a first communication format signal sent together with a clock from the first device to the second device under a first mode, and
      a second communication format signal sent from the second device to the first device under a second mode,
   wherein the first communication format signal includes a first start bit, a plurality of first data bits, a plurality of first inverted data bits, a first check bit generated from the first data bits and a first inversion check bit, and
   the second communication format signal includes a second start bit, a plurality of second data bits, and a second check bit generated from the second data bits.

2. The communication system according to claim 1, wherein the first data bits and the first inverted data bits are alternately arranged in the first communication format signal.

3. The communication system according to claim 1, wherein the first communication format signal is formed by arranging the first start bit, the first data bits and the first inverted data bits in this order, and
   the first check bit, a first constant bit, and the first inversion check bit are embedded in this order in the first data bits and the first inverted data bits.

4. The communication system according to claim 1, wherein the first communication format signal is formed by sequentially arranging the first data bits, the first check bit, a first constant bit, a part of the first data bits, the first inverted data bits corresponding to another part of the first data bits, and the first inversion check bit.

5. A communication method for performing serial communication using a first level, a second level different from the first level and a middle level between the first level and the second level, the communication method comprising:
   performing the serial communication by
      sending a first communication format signal together with a clock from a first device to a second device via a signal line connecting the first device to the second device under a first mode, and
      sending a second communication format signal from the second device to the first device via the signal line under a second mode,
   wherein the first communication format signal includes a first start bit, a plurality of first data bits, a plurality of first inverted data bits, a first check bit generated from the first data bits and a first inversion check bit, and
   the second communication format signal includes a second start bit, a plurality of second data bits, and a second check bit generated from the second data bits.

6. The communication method according to claim 5, wherein the first data bits and the first inverted data bits are alternately arranged in the first communication format signal.

7. The communication method according to claim 5, wherein the first communication format signal is formed by arranging the first start bit, the first data bits and the first inverted data bits in this order, and
   the first check bit, a first constant bit, and the first inversion check bit are embedded in this order in the first data bits and the first inverted data bits.

8. The communication method according to claim 5, wherein the first communication format signal is formed by sequentially arranging the first data bits, the first check bit, a first constant bit, a part of the first data bits, the first inverted data bits corresponding to another part of the first data bits, and the first inversion check bit.

9. A communication device of a communication system for performing serial communication using a first level, a second level different from the first level and a middle level between the first level and the second level, the communication system including the communication device as a first device, a second device, and a signal line connecting the first device to the second device, the communication device comprising:
   a sending unit configured to send a first communication format signal together with a clock to the second device; and
   a receiving unit configured to receive a second communication format signal from the second device,
   wherein the first communication format signal includes a first start bit, a plurality of first data bits, a plurality of first inverted data bits, a first check bit generated from the first data bits and a first inversion check bit, and
   the second communication format signal includes a second start bit, a plurality of second data bits, and a second check bit generated from the second data bits.

10. The communication device according to claim 9, wherein the first data bits and the first inverted data bits are alternately arranged in the first communication format signal.

11. The communication device according to claim 9, wherein the first communication format signal is formed by arranging the first start bit, the first data bits and the first inverted data bits in this order, and
   the first check bit, a first constant bit, and the first inversion check bit are embedded in this order in the first data bits and the first inverted data bits.

12. The communication device according to claim 9, wherein the first communication format signal is formed by sequentially arranging the first data bits, the first check bit, a first constant bit, a part of the first data bits, the first inverted data bits corresponding to another part of the first data bits, and the first inversion check bit.

* * * * *